(12) United States Patent
Horvath et al.

(10) Patent No.: US 8,031,728 B2
(45) Date of Patent: Oct. 4, 2011

(54) METHOD OF CONTROLLING AUDIO COMMUNICATION ON A NETWORK

(75) Inventors: Ernst Horvath, Vienna (AT); Karl Klaghofer, Munich (DE); Gerd-Dieter Spahl, Puchheim (AT)

(73) Assignee: Siemens Aktiengesellschaft, Munich (DE)

( * ) Notice: Subject to any disclaimer, the term of this patent is extended or adjusted under 35 U.S.C. 154(b) by 1030 days.

(21) Appl. No.: 10/899,301

(22) Filed: Jul. 27, 2004

(65) Prior Publication Data

US 2005/0053055 A1   Mar. 10, 2005

(30) Foreign Application Priority Data

Sep. 2, 2003  (GB) .................................. 0320540.8

(51) Int. Cl.
    *H04L 12/28* (2006.01)
(52) U.S. Cl. ......... 370/412; 370/230; 370/352; 370/466
(58) Field of Classification Search .................. 370/231, 370/494, 495, 493, 352, 393, 230, 516, 353, 370/412, 216, 389, 466, 395.63, 401, 392, 370/395.21; 379/338; 709/224, 231
See application file for complete search history.

(56) References Cited

U.S. PATENT DOCUMENTS

| | | | | |
|---|---|---|---|---|
| 5,452,293 A * | 9/1995 | Wilkinson et al. | ....... | 370/395.21 |
| 5,650,999 A * | 7/1997 | Dickson | ........................ | 370/231 |
| 6,366,959 B1 * | 4/2002 | Sidhu et al. | .................... | 709/231 |
| 6,421,720 B2 * | 7/2002 | Fitzgerald | ..................... | 709/224 |
| 6,452,950 B1 | 9/2002 | Ohlsson et al. | | |
| 6,600,735 B1 * | 7/2003 | Iwama et al. | ................... | 370/352 |
| 6,704,306 B1 * | 3/2004 | Cho | .............................. | 370/353 |
| 6,707,827 B1 * | 3/2004 | Shaffer et al. | .................. | 370/493 |
| 6,757,276 B1 * | 6/2004 | Harper et al. | .................. | 370/356 |
| 6,856,613 B1 * | 2/2005 | Murphy | ........................ | 370/352 |
| 6,862,298 B1 * | 3/2005 | Smith et al. | .................... | 370/516 |
| 6,996,059 B1 * | 2/2006 | Tonogai | ......................... | 370/230 |
| 7,006,511 B2 * | 2/2006 | Lanzafame et al. | ........... | 370/412 |
| 7,260,060 B1 * | 8/2007 | Abaye et al. | ................... | 370/230 |
| 7,275,093 B1 * | 9/2007 | Freed et al. | .................... | 709/223 |
| 7,522,631 B1 * | 4/2009 | Brown et al. | ................... | 370/466 |
| 2002/0167911 A1 | 11/2002 | Hickey | | |
| 2002/0186660 A1 | 12/2002 | Bahadiroglu | | |

(Continued)

FOREIGN PATENT DOCUMENTS

EP            1104958            6/2001

(Continued)

OTHER PUBLICATIONS

European Search Report dated Sep. 27, 2007 (Two (2) pages).

(Continued)

*Primary Examiner* — Aung S Moe
*Assistant Examiner* — Vinncelas Louis
(74) *Attorney, Agent, or Firm* — Crowell & Moring LLP

(57) ABSTRACT

A method of controlling provision of audio communication on a network comprising at least two endpoints (1, 3), at least one acting as a source and at least one acting as a destination, comprises setting a desired maximum and minimum packet size at the source; setting a desired maximum and minimum packet size at the destination; determining a minimum send packet size as the greater of the desired minimum set by the source and the desired minimum set by the destination; setting a jitter buffer at the destination to an appropriate size for the determined minimum send packet size; and transmitting audio packets of a size greater than or equal to the determined minimum send packet size.

20 Claims, 2 Drawing Sheets

U.S. PATENT DOCUMENTS

| | | | |
|---|---|---|---|
| 2003/0219006 A1* | 11/2003 | Har | 370/352 |
| 2004/0013108 A1* | 1/2004 | Ruckstuhl | 370/352 |
| 2005/0091392 A1* | 4/2005 | Gesswein et al. | 709/231 |

FOREIGN PATENT DOCUMENTS

| | | |
|---|---|---|
| EP | 1278353 | 1/2003 |
| WO | WO 01/15396 A1 | 3/2001 |
| WO | WO 01/93516 | 12/2001 |
| WO | WO 02/052399 | 7/2002 |
| WO | WO 02/087137 | 10/2002 |

OTHER PUBLICATIONS

Office Action in European Patent Application No. 04 016 879.1-1249 dated Dec. 16, 2009.

* cited by examiner

METHOD OF CONTROLLING AUDIO COMMUNICATION ON A NETWORK

The present invention relates to a method of controlling audio communication on a network, in particular for VoIP systems.

Voice over internet protocol (VoIP) is characterised by the fact that the sender compiles a continuous audio stream (PCM: 1 byte every 125 μs), bundles it in packets and sends it over a local area network (LAN) interface, although it is not limited to use with LANs. Depending on coding there are different minimum requirements for the packet size (G.711: 1 byte; G.723.1: 240 bytes; G.729A: 80 bytes). To reduce the required bandwidth, the sender can also send multiples of this minimum size in one packet.

The receiver in turn receives the packets via the LAN interface and converts them back into a continuous audio stream. The conversion (and if appropriate compression) of the audio stream is generally carried out by what are known as digital signal processors (DSP), while the transport of the packet between the DSP and the LAN interface is carried out by a central processing unit (CPU).

Load on the CPU depends not on the type of packets, but solely on the rate at which these packets arrive. The smaller the packet size, the higher the packet rate and hence the CPU load and bandwidth requirement. On the other hand, the higher the packet rate, the smaller the mouth-to-ear delay and hence the better the speech quality for the user.

In the case of gateways with a large number of channels, the problem now is that the terminals send at a high packet rate in order to achieve the desired speech quality, resulting in a CPU load on the gateway which is high and maybe too high for the CPU to cope with.

Currently there is no facility for controlling the rate of the incoming voice packets, since in the protocols there is only one field for the maximum packet size, which corresponds to a minimum packet rate. The packet rate of the terminals therefore relies on a compromise rate, which on the one hand does not overload the gateways and in the case of direct connections between two terminals permits the speech quality to be as high as possible.

In accordance with the present invention, a method of controlling audio communication on a network comprising at least two endpoints, at least one acting as a source and at least one acting as a destination comprises setting a desired maximum and minimum packet size at the source; setting a desired maximum and minimum packet size at the destination; determining a minimum send packet size as the greater of the desired minimum set by the source and the desired minimum set by the destination; setting a jitter buffer at the destination to an appropriate size for the determined minimum send packet size; and transmitting audio packets of a size greater than or equal to the determined minimum send packet size.

The present invention sets both a maximum packet size and a minimum packet size in both the source and destination during negotiation of voice coding and signals the resultant settings to the source sending the audio communication. The maximum packet size conforms with existing standards to ensure a minimum packet rate and in addition the minimum packet size is determined, so that a balanced relationship between speech quality in the form of mouth-to-ear delay and resource requirement is produced. For the IP endpoints, this means achieving an acceptable CPU load and in the network, meeting bandwidth requirements. The minimum packet size for sending must not be less than the minimum set at the destination for receiving.

In one embodiment, the destination notifies the source of an increase in the minimum packet size; and initiates a corresponding increase in the size of the jitter buffer.

If the CPU load seems to be getting too high, the destination can notify the source of the change during a call and will increase the jitter buffer size during a break in conversation.

Alternatively, the source notifies the destination of an increase in the minimum packet size; and the destination initiates a corresponding increase in the size of the jitter buffer.

The source can also choose to increase the minimum packet size and notifies the destination of this.

Preferably, the minimum packet size of the source is set between the minimum and the maximum packet size set by the destination.

Preferably, the source and the destination comprise any one of a terminal, a server and a gateway in an IP network.

Various combinations are possible, including a terminal as the source and a gateway as the destination; or two terminals, one as source and one as destination or other combinations thereof.

Typically, the network uses voice over internet protocol (VoIP), including carrier VoIP systems.

An example of a method of controlling provision of audio communication on a network comprising at least two endpoints will now be described with reference to the accompanying drawings in which.

Figure 1:
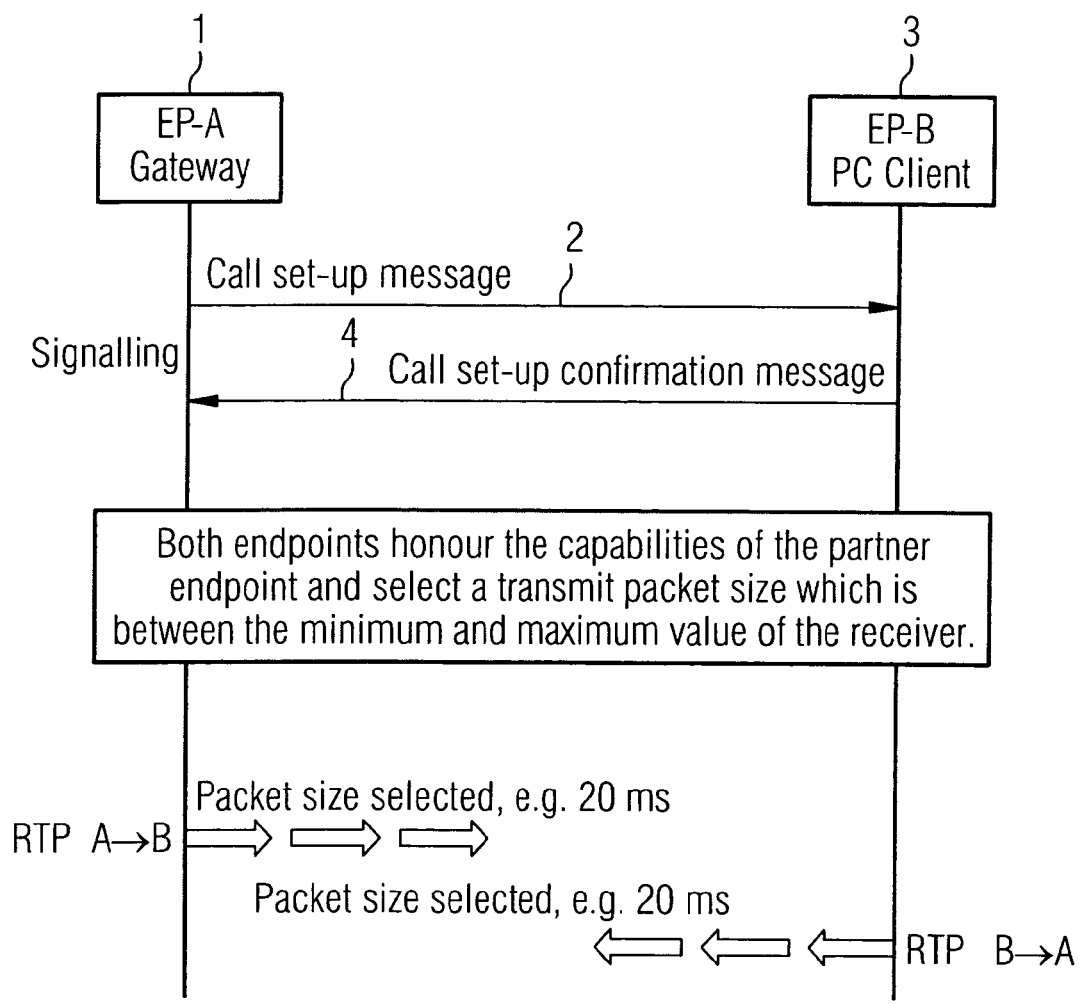
FIG. 1 shows an example of message traffic between two endpoints using the method of the present invention.

Each end point (EP) has two parameters. The first of these is the minimum packet size at which it can receive packets and the second is the minimum packet size at which it can send packets. The transmit packet size must not be less than the minimum set by the destination EP and the source EP must not exceed its own performance limits. Thus, the source EP can then choose to transmit packets having a size ranging from the larger of either the source EP minimum packet size for sending and the destination EP minimum packet size for receiving, to the destination EP's maximum packet size for receiving.

Conventional H.323 systems carry audio data as RTP streams over UDP/IP. The properties of the audio streams are exchanged via H.245 messages as part of the terminal capability exchange procedure and in the process of opening a logical channel for the audio stream. One of the parameters for audio streams is the maximum number of frames per packet. This value represents the maximum time interval conveyed by one packet and thus the packet size, as well as the packet rate at which packets are transmitted by an audio source. A source must not exceed the packet size stated in this parameter, but is allowed to send smaller packets more frequently. For example, for G.711 streams a maximum interval of 20 msec (160 frames/packet) may have been negotiated, but the source may choose to send a packet every 10 msec (80 frames/packet) or even more frequently.

For QoS reasons a high packet rate (small packet size) is desirable because in this case audio frames are sent with low delay and the effect of a lost packet is less severe. However, a smaller payload size means a relatively higher packet overhead and less bandwidth efficiency. More frequent packet arrivals will also raise the processing load at the receiver. An implementation has to take this trade-off between efficiency and QoS requirements into account. For large gateways the packet arrival rate may become critical during high traffic load. If, in such a situation, transmitters reduced the packet rate by enlarging the packet size, the performance of the gateway could be improved, allowing the gateway to maintain a high number of calls at the risk of some decrease in the QoS of individual calls.

The present invention introduces a minimum packet size indication as part of the VoIP signalling between two entities. In one example of the present invention, a minimum packet size (minimum number of frames/packet) is added to the H.245 messages. The transmitting side is then required to send packets no more frequently than determined by this parameter. The parameter may be stated as part of the terminal capabilities and during logical channel signalling. A further feature is the provision of dynamic adaptation of the packet size (i.e. packet rate) to the traffic load. For example, a call starting with a packet size of 10 msec/packet would be raised to a size of 30 msec/packet if a critical load is reached at the gateway. For this adaptation the gateway needs a means of telling the transmitting side to temporarily reduce its packet rate, similar to the existing flow control mechanism of H.245.

Control of received packet rate for a payload in a VoIP system using the method of the present invention is illustrated by way of example in FIG. 1. This shows typical message flow between two VoIP endpoints in a VoIP packet network for controlling send packet size. An endpoint A 1, in this example a gateway, sends a call set up message 2 to an endpoint B 3, in this example a personal computer. The endpoint B sends back a call set up confirmation message 4. VoIP endpoints may include gateways, IP phones, software clients on a PC or server endpoints. Various VoIP signalling protocols may be used, such as Standard H.323 [ITU-T Recommendation H.323—Packet based Multimedia Communication Systems], Standard SIP [RFC 3261 SIP—Session Initiation Protocol] or proprietary VoIP protocols. User data is transmitted via the packet network using RFC 1889 RTP/RTCP—Real time Protocol/Real time Control Protocol.

In the example of FIG. 1, the endpoint A 1 is an endpoint (EP) which, in the receive direction, requires audio media streams having a minimum packet size of 20 ms for, for instance, a G.711 codec. This is indicated in the call set-up message (G711PSRvMaxA=60, G711PSRvMinA=20) and this EP also requires a maximum packet size in the receive direction for G.711 codec of 60 ms. The minimum packet size enables EP-A to ensure that the number of incoming real time protocol (RTP) speech packets per unit of time in EP-A can be kept relatively low, something which, for example, might be necessary in EP-A for performance reasons. EP-A might be a gateway which must be able to process several calls including audio streams simultaneously (the more packets to be processed per unit of time, the more exacting the performance requirements placed on the EP become).

For this example, EP-B 3 is a PC with a H.323 software client. The PC has sufficient performance and, as a rule, only needs to be able to handle one call (media stream) at a time. EP-B therefore also offers a maximum packet size in the receive direction of 60 ms, but offers a minimum packet size for a G.711 codec of 10 ms, which is a relatively small packet size, because EP-B is capable of processing a relatively large number of received packets per unit of time, a fact which, for example, has a positive impact on end-to-end delay. The relevant minimum and maximum receive packet size for a G.711 codec (but also for other supported codecs such as G.723.1 or G.729) is signalled by the endpoints 1, 3 to the partner endpoints 1, 3 during call set-up 2 and call set-up confirmation 4 messages. The call set up confirmation message for this example is G711PSRvMaxB=60, G711PSRvMinB=10. For example in the case of the SIP Standard, new parameters are signalled, for example by means of extensions in SDP [RFC 2327 SDP—Session Description Protocol] in SIP INVITE or 200-OK messages. In the case of H.323, new parameters are signalled, for example, by means of Element AudioCapability or Generic-Capability extensions in the H.245 Standard [ITU-T Recommendation H.245—Control Protocol for Multimedia Communication]. In the H.323 and SIP Standards, only details of maximum packet sizes are disclosed. In the SIP Standard there is an element regarding a recommended packet size but this is not mandatory. Neither standard contains details of minimum packet sizes.

A further feature of the present invention is that if the criteria such as performance situation in the EP, bandwidth in the network, etc., which, at the time of call set-up, resulted in defining and sending the initial minimum and maximum packet size values happen to change during the call, there can be a repeated exchange of capabilities including the then modified minimum or maximum values. These modified values must be honoured by the partner endpoints. In SIP systems, this can be signalled, for example, by means of RFC 3264 SDP Offer/Answer model [RFC 3264 SDP Offer/Answer Model] using extended parameters. In H.323 systems this can take place, for example, by repeated exchange of H.245 Terminal Capability Set messages (with an extended parameter set) or in Standard H.460.6 [ITU-T Recommendation H.460.6—Extended Fast Connect] by Extended Fast Connect. If the receiver requests during the call that the sender increase the packet size, then to avoid voice drop-outs, the jitter buffer must be increased by this delta in a pause in the conversation, before the request to increase the packet size is sent. Alternatively, the sender can inform the receiver that the packet size is being increased in the output direction. This notification is then used to increase the jitter buffer by this value in a pause in the conversation.

Another option is that in order to set the optimum voice quality whilst complying with resource limitations, the source EP 1, 3 will select the packet size for the send direction as the maximum possible chosen from its own minimum size for sending and the minimum size for receiving set by the partner EP, that is, it will choose the greater of these two values. An example in which a gateway is configurable as regards speech quality, is that the packet size for G.711, for instance, can be reduced from 240 bytes to 80 bytes, in which case only ⅓ of the channels are then supported. At the moment only the own send direction can be controlled.

Figure 2:
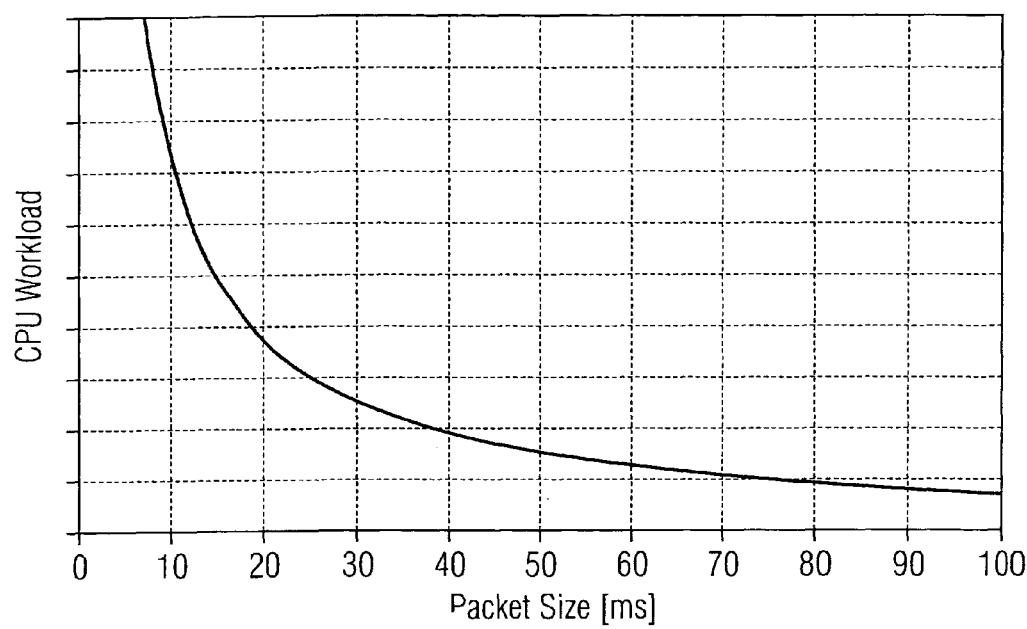
FIG. 2 shows utilisation of the CPU of a main processor as a function of packet size.
Figure 3:
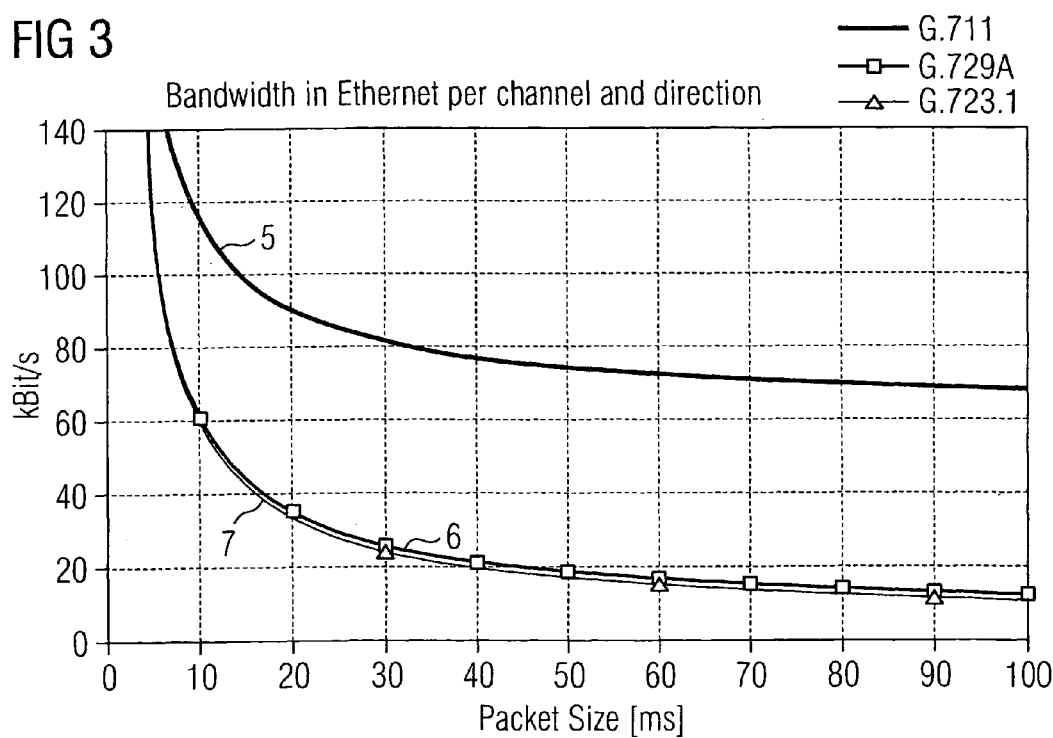
FIG. 3 shows bandwidth requirement per channel as a function of packet size for three different codecs.

FIGS. 2 and 3 illustrate the effect of packet rate on resources. FIG. 2 shows the utilisation of the CPU of a main processor as a function of packet size. CPU capacity utilisation does not depend on the selected codec. The CPU workload is inversely proportional to the packet size, i.e. if the packet size halves, the time between 2 packets halves and the packet rate and the CPU workload double.

In FIG. 3 the bandwidth requirement in Ethernet per channel as a function of packet size and the selected codec is shown. The bandwidth for the actual payload data is, after compression, shown by curve 5 to be 64 kBit/s in the case of G.711, by curve 6 to be 8 kBit/s in the case of G.729A and by curve 7 to be 6.4 kBit/s for G.723.1. However, protocol headers are required for each packet: RTP 12 bytes, UDP 8 bytes, IP 20 bytes, Ethernet (including preamble and Frame Check Sequence but without VLAN tagging) 26 bytes. This header component increases the bandwidth actually required depending on the packet rate.

However, not all packet sizes are possible because of limitations of the codecs themselves. G.729A only permits multiples of 10 ms, whereas G.723.1 permits multiples of 30 ms. The curves 6, 7 in FIG. 2 for G.729A and G.723.1 are therefore calculated theoretically because, in practice, only the discrete values represented by the squares or triangles can actually occur.

The present invention makes low-cost IP gateway solutions possible, without losing the advantages of high speech quality for calls between IP phones.

The invention claimed is:

1. A method of controlling audio communication on a network comprising at least two endpoints, at least one acting as a source and at least one acting as a destination, wherein each endpoint can send or receive packets, the method comprising:
    setting a desired maximum and minimum packet size at the source for sending packets;
    setting a desired maximum and minimum packet size at the destination for receiving packets;
    comparing the desired minimum packet sizes set at the source and destination;
    determining, based on the comparison, a minimum send packet size as the greater of the desired minimum set by the source and the desired minimum set by the destination;
    setting a jitter buffer at the destination to an appropriate size for the determined minimum send packet size; and
    transmitting audio packets of a size greater than or equal to the determined minimum send packet size.

2. A method according to claim 1, wherein the destination notifies the source of an increase in the minimum packet size, and initiates a corresponding increase in the size of the jitter buffer.

3. A method according to claim 1, wherein the source notifies the destination of an increase in the minimum packet size, and the destination initiates a corresponding increase in the size of the jitter buffer.

4. A method according to claim 3, wherein the minimum packet size of the source is set between the minimum and the maximum packet size set by the destination.

5. A method according to claim 1, wherein the source comprises one of a terminal, a server and a gateway in an IP network.

6. A method according to claim 1, wherein the destination comprises one of a terminal, a server and a gateway in an IP network.

7. A method according to claim 1, wherein the network uses voice over internet protocol.

8. A method according to claim 1, wherein the audio communication comprises voice communication.

9. A method of controlling audio communication on a network comprising at least two endpoints, at least one acting as a source and at least one acting as a destination, wherein each endpoint can send or receive packets, the method comprising:
    setting, by the source, a desired maximum and minimum packet size for the source for sending packets;
    receiving, by the source from the destination, a desired maximum and minimum packet size for receiving packets by the destination;
    comparing, by the source, the minimum packet size set for the source with the received minimum packet size for the destination;
    determining, by the source, a minimum send packet size based on the comparison, wherein the minimum send packet size is determined to be the greater of the desired minimum of the source and the desired minimum of the destination;
    setting a jitter buffer at the source to an appropriate size for the determined minimum send packet size; and
    transmitting, by the source, audio packets of a size greater than or equal to the determined minimum send packet size.

10. The method of claim 9, wherein the desired maximum and minimum packet size for the destination is received during a call setup between the source and destination.

11. The method of claim 9, wherein the desired maximum and minimum packet size for the destination is received after a call setup between the source and destination.

12. A method according to claim 9, wherein the source receives a notification from the destination of an increase in the minimum packet size, and the source initiates a corresponding increase in the size of the jitter buffer.

13. A method according to claim 9, wherein the minimum packet size for the source is set between the minimum and the maximum packet size set by the destination.

14. A method according to claim 9, wherein the source comprises one of a terminal, a server and a gateway in an IP network.

15. A method according to claim 9, wherein the destination comprises one of a terminal, a server and a gateway in an IP network.

16. A method of controlling audio communication on a network comprising at least two endpoints, at least one acting as a source and at least one acting as a destination, wherein each endpoint can send or receive packets, the method comprising:
    setting, by the destination, a desired maximum and minimum packet size for the destination for receiving packets;
    receiving, by the destination from the source, a desired maximum and minimum packet size for sending packets by the source;
    comparing, by the destination, the minimum packet size for the destination with the received minimum packet size for the source;
    determining, by the destination, a minimum send packet size based on the comparison, wherein the minimum send packet size is determined to be the greater of the desired minimum of the source and the desired minimum of the destination;
    setting a jitter buffer at the destination to an appropriate size for the determined minimum send packet size; and
    transmitting, by the destination, audio packets of a size greater than or equal to the determined minimum send packet size.

17. The method of claim 16, wherein the desired maximum and minimum packet size for the source is received during a call setup between the source and destination.

18. The method of claim 16, wherein the desired maximum and minimum packet size for the source is received after a call setup between the source and destination.

19. A method according to claim 16, wherein the destination receives a notification from the source of an increase in the minimum packet size, and the destination initiates a corresponding increase in the size of the jitter buffer.

20. A method according to claim 16, wherein the minimum packet size for the destination is set between the minimum and the maximum packet size set by the source.

* * * * *